United States Patent

Bjorklund et al.

[11] 4,233,880
[45] Nov. 18, 1980

[54] STAINLESS STEEL DRILL SCREW

[75] Inventors: Lowell L. Bjorklund, Elgin; Ramon A. Berg, Roselle; George A. Friedland, Hampshire, all of Ill.

[73] Assignee: Illinois Tool Works Inc., Chicago, Ill.

[21] Appl. No.: 926,185

[22] Filed: Jul. 20, 1978

[51] Int. Cl.² .............................................. F16B 25/00
[52] U.S. Cl. .......................................... 85/41; 148/38; 148/136; 408/226
[58] Field of Search .......................... 85/41, 47, 1 C; 148/136, 38, 12 E, 14; 75/123 K; 408/199, 226–230; 10/10 R

[56] References Cited

U.S. PATENT DOCUMENTS

| | | | |
|---|---|---|---|
| 3,235,378 | 2/1966 | Jennings | 148/136 X |
| 3,241,426 | 3/1966 | Gutshall | 85/47 |
| 3,253,908 | 5/1966 | Tanczyn | 148/136 X |
| 3,318,182 | 5/1967 | Carlson | 85/41 |
| 3,957,545 | 5/1976 | Mimino et al. | 148/136 X |
| 4,022,586 | 5/1977 | Espy | 148/38 X |
| 4,039,356 | 8/1977 | Schumacher et al. | 148/136 X |

Primary Examiner—Ramon S. Britts
Attorney, Agent, or Firm—Richard K. Thomson; Robert W. Beart

[57] ABSTRACT

A drilling and tapping screw constructed from a 300 series stainless steel material which has the corrosive resistance of the high chromium high nickel content stainless steel while still being capable of drilling through carbon steel materials or the like. The product is constructed by forging the point at very slow forging speeds, resulting in a drill screw which is a predominantly martensitic structure at the drill point while predominantly austenitic in the shank and head regions.

4 Claims, 6 Drawing Figures

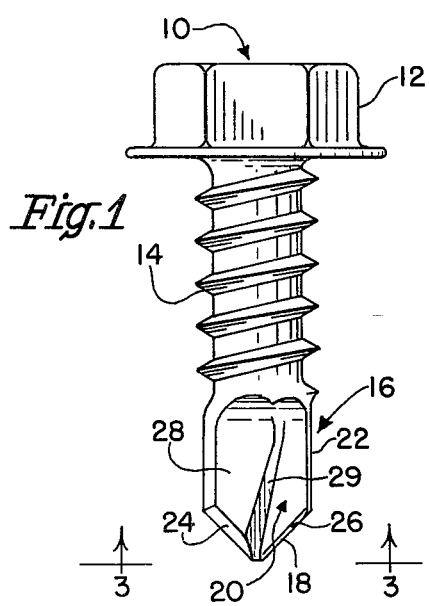
Fig.1
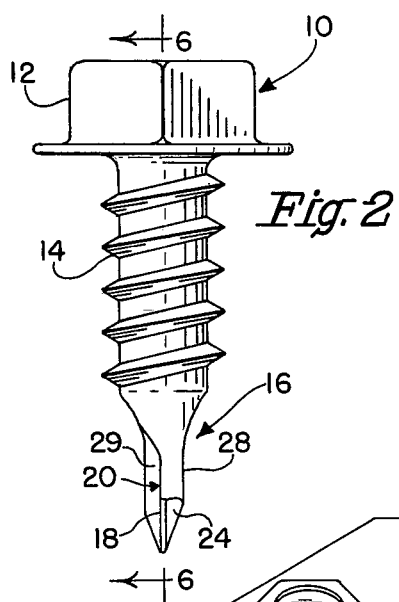
Fig.2
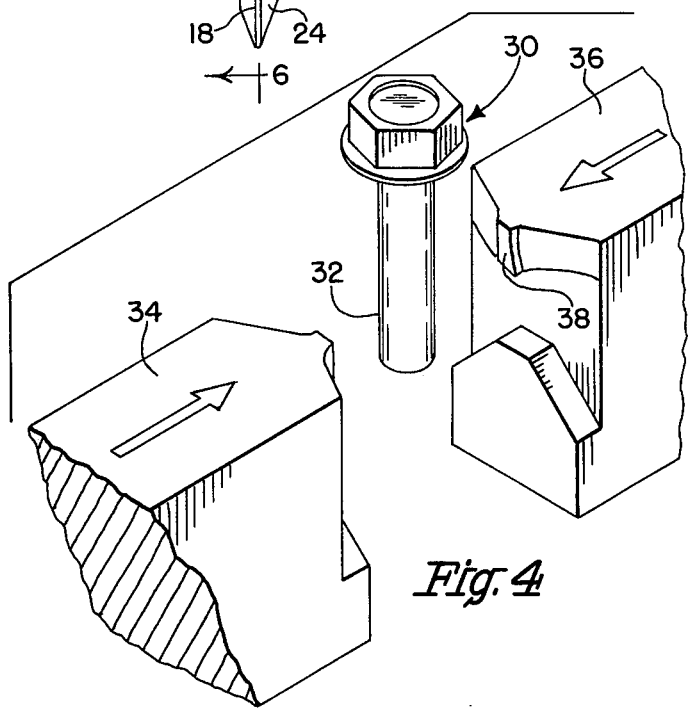
Fig.4
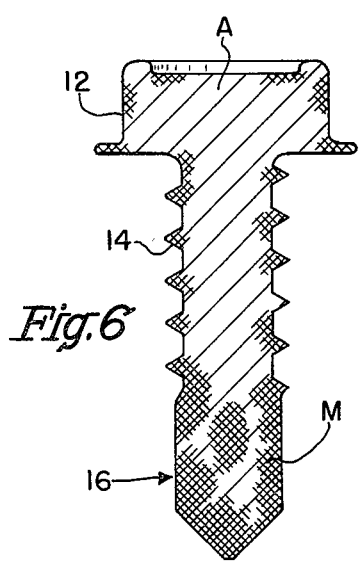
Fig.3
Fig.6
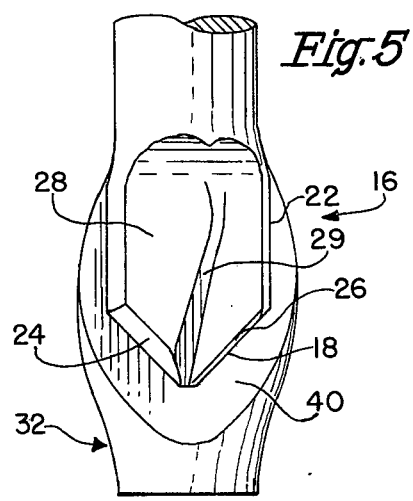
Fig.5

STAINLESS STEEL DRILL SCREW

BACKGROUND OF THE INVENTION

This invention relates generally to a drill screw, and more particularly to a drill screw of highly corrosive resistant stainless steel material.

The ever increasing demand and requirements for corrosive resistant materials, particularly in fasteners, has highlighted a problem in the area of self-drilling screws. A typical self-drilling and tapping screw should be of a hardness of Rc 50 or above in order to successfully drill and tap in material, such as mild carbon steel. Heretofore, the corrosive resistance of the fastener had to be sacrificed in order to produce a fastener which could successfully drill and tap such materials. For example, 410 series stainless steel is a hardenable martensitic material and typically includes a chromium content of only 11.5%–13.5%. The hardening is usually accomplished by a typical heat treating or case hardening technique. However, in a 300 series stainless steel, which inludes a higher chromium content, such a structure is usually a nonhardenable, austenitic material. Such material is highly beneficial as a corrosive resistant and durable fastener but, to date, has not been capable of successfully drilling into carbon steel or similar materials.

Special steels have been developed, such as an 18—18 chromium manganese steel in order to produce a highly corrosive resistant material which is capable of drilling. Such steels, however, do have drawbacks in that they are extremely hard and, thus, are also very difficult to head and thus create a very short tool life for heading dies or the like.

Compromise solutions to this problem have been suggested in the way of a composite fastener. For example, a 300 series overcap has been suggested for use with a typically cold headed carbon steel screw. This, obviously, is capable of drilling and retaining certain corrosive resistance at the head. However, corrosion of the shank remains a problem, as well as the increased costs due to a plurality of parts, handling and the like.

Composite screws which utilize a shank and head of a 300 series steel in a point region of carbon steel which is in some manner secured to the shank has also been suggested. However, an increased handling problem obviously exists and to date no successful solution as to proper securement of the point to the shank has been suggested.

The proper combination of ease of manufacture, corrosive resistance level, and capability of drilling through carbon steel has not been successfully obtained in any of the prior art attempts thus far.

SUMMARY OF THE INVENTION

It is a principle object of the invention to provide a highly corrosive resistant drill screw of 300 series stainless steel which is capable of drilling into carbon steel material or the like.

A further principle object of the invention is to obtain a method of efficiently producing a 300 series stainless screw having a drill point capable of drilling through carbon steel material or the like.

A further object of the invention is to produce a fastener from an austenitic stainless steel material of a high chromium content having a hardened drill point capable of drilling through carbon steel materials.

One of the advantages of the invention is the ability to massproduce the fasteners through a forging process.

A still further object and advantage of this invention is the capability of producing a drill screw which is relatively easier to cold head than other stainless steel materials which might be considered to provide the hardness necessary for drilling.

The above and other objects and advantages of this invention are provided by a fastener produced from a 300 series stainless steel material which is austenitic prior to forming operations and which is transformed into a fastener which is predominantly martensitic at the drill point but predominantly austenitic in the other region. The chemistry of the material prior to working preferably includes 7.75%–8.25% Ni, 0.06%–0.10% C. and 17%–18.5% Cr, in order to give the proper balance of hardness, corrosive resistance and tool life.

The self-drilling fastener which is predominantly martensitic at the drill point and austenitic in the other areas is advantageously produced by a cold forging method and more particularly by a method wherein the forging takes place at an extremely slow linear speed. For example, it has been found that a forging speed not exceeding 6 inches per minute successfully transforms the austenitic structure to a predominantly martensitic structure at the drill point region. It has also been found that the structure becomes martensitic more readily when the blank is in a chilled condition.

Since the working or forging plays an important part in the production of the successful drill screw, the point is designed to produce a maximum amount of movement of material. For example, it has been found advantageous to produce a point which is at least 50% less in transverse dimension across the point than it is in transverse dimension along the cutting edges of the point.

BRIEF DESCRIPTION OF THE DRAWINGS

The above and other aspects and advantages of the invention will be more readily apparent when considered in conjunction with the following description and the accompanying drawings wherein:

FIG. 1 is a side elevational view of the completed self-drilling fastener according to the invention.

FIG. 2 is a side elevational view taken 90° relative to FIG. 1 of the self-drilling fastener of the invention.

FIG. 3 is a point end view taken in the direction of lines 3—3 of FIG. 1.

FIG. 4 is a perspective representation of the manner of producing a self-drilling screw in accordance with the invention.

FIG. 5 is a partial elevational view of the point section of the blank after it has been forged.

FIG. 6 is an illustration as taken along a cross-sectional line 6—6 of FIG. 2 showing the relative percentages of martensitic structure and austenitic structure throughout the finished fastener.

DETAILED DESCRIPTION OF THE PREFERRED EMBODIMENTS

Turning first to FIGS. 1-3, a general description of the self-drilling fastener will be apparent. The fastener 10 basically is comprised of an enlarged head 12, a threaded shank 14, and a drill point 16. The drill point will typically include a pair of generally longitudinally extending flutes 20 comprising a first flute surface 21 terminating in laterally outward and upward extending cutting edges 18 and generally longitudinally extending cutting edges 22. A second flute surface 29 is formed and will be of a much less radial extent than the first flute surface 21, for a purpose to be described later herein. An angled relief surface 24 is formed behind each of the opposed cutting edges 18 intersecting a trailing reduced dimension shank region 28. As will become apparent from the drawings, a preferred embodiment of the invention contemplates a drill point which is configured to be of appreciably less dimension in one radial direction than in the radial direction which includes the cutting edges. The drill point of the preferred embodiment will thus have a cross-sectional area at least 50% less than the cross-sectional area of the shank region. For example, on a No. 8 screw typical dimensions will be such that the crest diameter of the threaded region 14 will be about 0.167 inch and the major diameter of the point taken across and within the plane of the cutting edges 18 will be about 0.136 inch while the transverse dimension taken across drag surfaces 28 will be about 0.06 inch.

Since one of the primary purposes of the invention is to produce a screw which has a high resistance to corrosion, the screw blank should preferably be of a 300 series stainless steel austenitic material. The method of forming the drill screw forms an important part of the invention and attention is directed to FIG. 4 wherein a blank 30 of a 300 series stainless austenitic material is in some manner positioned between a pair of opposing forging dies 34 and 36. In a manner typical of prior art forged drill screw technology, the opposing dies 34 and 36 are moved relative to one another in directions of the arrows so as to compress an entering end 32 of the blank. It should be understood that one or both of the dies 34 and 36 may be moved to create the necessary relative movement. The compression of the entering end 32 is done so as to create the drill point configuration 16 through the use of a pair of identical but reversed die impressions 38 or dies 34 and 36. However, in a manner untypical of the prior art, the dies 34 and 36, or one of these two, are moved at very slow speed during the actual forging or metal moving operation. It has been determined that a speed of forging of between 1 inch per minute and 6 inches per minute achieves the desired results of the invention. In fact, the preferred speed is approximately 1 inch per minute during forging operations. It has also been determined that when the entering point of a drill screw blank that is of an austenitic 300 series stainless material is so worked or compressed at such a slow speed, the austenitic structure at the point is transformed to a predominantly martensitic structure.

Attention is directed to FIGS. 5 and 6 showing, respectively, the entering extremity 32 after it has been deformed to create the flat type of a drill point shown in FIGS. 1-3. Because the extremity 32 is required to be drastically deformed by moving material so that one lateral dimension of the point is at least reduced to half the lateral dimension of the cutting edges, substantial cold working is accomplished. This cold working and transformation from austenitic to martensitic structure produces a drill screw which is capable of drilling through carbon steel or the like. In fact, such a slow forging operation on austenitic 300 series stainless steel produces hardnesses at the point, and particularly at the cutting edges, in the range of 50-58 Rc.

Attention is now directed to FIG. 6 which illustrates the structure of the stainless steel material after the forging operation, thread rolling and heading. It will be shown that the darker shaded cross-sectioning areas denoted by the reference character M broadly illustrate the percentage of martensitic structure in various regions compared to the percentage of austenitic structure, denoted by reference character A. As a result of the slow forging, the martensitic structure at the drill point region is quite high and, in fact, generally in the range of 40%-70% and in certain instances this percentage may be appreciably higher depending on certain other factors to be discussed later herein. As a result of certain slight cold working, a small percentage of austenite will be transformed into martensite in the shank and heading regions. It has been found that the percentage of martensite in these regions is generally 10%-40%. The rather large percentage of martensitic structure at the point is evidenced by a highly magnectic condition at the point, while the other regions do not exhibit this high magnetism.

While the fastener is broadly described as a 300 series stainless austenitic material prior to operation, it has been found that certain chemistry in the material becomes important to achieve the desired results of hardness at the point and extensive corrosive resistance. For example, a percentage of chromium in the range of 17%-18.5% provides an acceptable chromium content for corrosive resistances as well as the proper combination of chromium with other elements to insure that the martensitic structure at the point is obtained while creating a material which is capable of efficient cold heading operations. The carbon content of the preferred stainless steel is generally in the range of 0.06%-1.01% in order to insure that the proper martensitic level is obtained. A further important ingredient in the preferred 300 series stainless is the nickel composition which should be generally in the range of 7.75%-8.25%. The nickel content becomes important in combination with the chromium to create the proper work hardening rate and proper range of hardness of the austenitic material to permit heading without significantly decreasing the tool life. The chemistry of the auetenitic material thus forms an important factor in the method and product described herein.

A further important factor in the production of the product and the product itself is the proper combination of the could working and martensitic transformation resulting from a point configuration shown in FIGS. 1-3. Still a further factor in the production of an acceptable product is the temperature of the blank during the forging operation. It has been found that a chilled bank will produce a martensitic structure at a much greater rate and percentage than a room temperature blank. In fact, blank temperatures in the range of 0° F. to −80° F. created by chilling by dry ice or other means clearly enhance the formation of martensitic structure at the point.

The finished product as shown in FIGS. 1-3 and 6 thus acheives the objects and advantages of the invention in that is is a generally 300 series stainless material exhibiting all of the desirable characteristics of a high chromium content fastener. It remains austenitic in the majority of regions, which is advantageous in strength and resistance to stress corrosion, but its point is highly martensitic, which enables an otherwise austenitic 300 series stainless to be capable of drilling through a hard material, such as carbon steel. In addition to the product, a preferred method of manufacturing has been disclosed, basically consisting of a very slow forgoing operation to produce a drill point which is martensitic and, in the preferred embodiment, a drill point which is of a substantially less dimension in one direction than in the other.

As shown in FIGS. 1-2, a slight rake angle 26 may be created at the cutting edges 18 and 22 to provide a positive rake behind the cutting edges into the flute. The reduced transverse dimension created between opposite heel or drag surfaces 28 also contributes to an efficient clearance of chips which in combination with the martensitic structure enables the otherwise 300 series stainless to properly drill.

Thus, it is apparent that there has been provided, in accordance with the invention, a 300 series stainless steel austenitic screw with a martensitic point and method of making such a screw that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A corrosive resistant self-drilling and thread-forming screw formed from a 300 series, initially primarily entirely austenitic, stainless steel material, comprising: an elongated shank having a helical thread formed thereon, a radially enlarged driving head at one extremity and a subsequently cold formed drill point at the opposite extremity, the drill point having 40%-70% martensitic structure as a result of point formation while the structure of the head and shank becomes only 10%-40% martensitic structure, providing a fastener with a drill point having at least a surface hardness in the range of Rc 50-58 said hardness being produced without subjecting the screw to elevated temperatures whereby said screw is capable of drilling through steel while retaining the desirable corrosion resistant characteristics of austenitic 300 series stainless steel.

2. The self-drilling and thread-forming screw of claim 1, wherein the austenitic stainless steel material generally comprises 7.75% to 8.25% Ni, 0.06% to 0.10% C and 17.0% to 18.5% Cr.

3. The self-drilling and thread-forming screw of claim 1, wherein the drill point includes a pair of radially outwardly and upwardly extending terminal cutting edges intersecting a side cutting edge, a flute region extending upwardly from the terminal cutting edges, the transverse dimension of the drill point generally in the plane of the cutting edges at least twice the transverse dimension of the point generally normal to the plane of the cutting edges, the cross-sectional area of the drill point being not generally greater than 50% of the cross-sectional area of the shank.

4. The self-drilling and thread forming screw of claim 1, wherein the drill point has at least 50% martensitic structure.

* * * * *